United States Patent [19]
Gardner et al.

[11] Patent Number: 5,365,229
[45] Date of Patent: Nov. 15, 1994

[54] ADAPTIVE TELEMETRY SYSTEM FOR HOSTILE ENVIRONMENT WELL LOGGING

[75] Inventors: Wallace R. Gardner, Houston; Kenneth R. Goodman, LaPorte, both of Tex.

[73] Assignee: Halliburton Logging Services, Inc., Houston, Tex.

[21] Appl. No.: 216,504

[22] Filed: Mar. 22, 1994

Related U.S. Application Data

[63] Continuation of Ser. No. 976,848, Nov. 16, 1992, abandoned.

[51] Int. Cl.$^5$ ............................................. G01V 1/00
[52] U.S. Cl. .............................. 340/855.4; 340/855.5; 367/76
[58] Field of Search ............... 340/855.4, 855.5, 855.3, 340/855.6; 367/81, 76, 77, 78; 364/422

[56] References Cited

U.S. PATENT DOCUMENTS

| | | | |
|---|---|---|---|
| 4,355,310 | 10/1982 | Belaigues et al. | 340/855.4 |
| 5,010,333 | 4/1991 | Gardner et al. | 340/856 |
| 5,091,725 | 2/1992 | Gard | 340/854.1 |

*Primary Examiner*—J. Woodrow Eldred
*Attorney, Agent, or Firm*—Arnold, White & Durkee

[57] ABSTRACT

The operation of hostile environment logging tools at temperatures up to 250° C. stresses not only the tools, it also places severe demands upon the wireline telemetry due to the wide variations in the logging cable transmission characteristics. A robust adaptive wireline telemetry system for use in hostile environments has been developed that combines sophisticated digital communication methods with modern Digital-Signal-Processing (DSP) techniques. The downhole telemetry transmitter outputs a multilevel signal. The uphole receiver includes an adaptive transversal-filter equalizer (TFE) that is continually optimized to correct for changing signal distortion. The system operates robustly at high data rates over the temperature range of 0° to 250° C.

7 Claims, 10 Drawing Sheets

O = UNEQUALIZED DATA ERRORS

| SIGNAL TYPES | BANDWIDTH EFFICIENCY (DATA-RATE/BANDWIDTH) | DATA RATE 7/32 INCH 1C CABLE | DATA RATE 15/32 INCH 7C CABLE |
|---|---|---|---|
| AM-NRZ, MANCHESTER | 0.5 BITS/SEC/Hz | 13.5 kbps | 90 kbps |
| AM-3DB, QPSK | 1.0 BITS/SEC/Hz | 27.2 kbps | 180 kbps |
| AM-7DB, 9-QPRS, 16-QAM | 2.0 BITS/SEC/Hz | 54.4 kbps | 360 kbps |
| 49-QPRS, 64-QAM | 4.0 BITS/SEC/Hz | 108.8 kbps | 720 kbps |

ADAPTIVE TELEMETRY SYSTEM FOR HOSTILE ENVIRONMENT WELL LOGGING

This application is a continuation of application Ser. No. 07/976,848, filed Nov. 16, 1992 in the names of the present inventors, and entitled "ADAPTIVE TELEMETRY FOR HOSTILE ENVIRONMENT WELL LOGGING now abandoned."

BACKGROUND OF THE DISCLOSURE

The operation of modern wireline-logging tools at hostile-environment temperatures places severe demands upon the telemetry as well as the downhole tools. The severe demands on the telemetry are caused by the wide variation in the logging-cable-produced signal distortion combined with the high-data-rate requirements of the tools and the limited logging-cable bandwidth. The large variations in telemetry signal distortion encountered in the course of logging a signal well are the result of the changes in average cable temperature produced by the large difference in borehole temperature between the top and bottom of a hostile-environment well. Telemetry signal distortion is a function of such things as cable manufacturer, cable type, cable length, cable condition, depth in the hole, and well temperature gradient.

The signal distortion produced by the cable must be corrected (equalized) before reliable recovery of the telemetry data at the surface can occur. The high data rate requirement increases the demands on the equalizer in two ways.

First, the high data rate telemetry requirement demands a high bandwidth efficiency (data-rate/frequency-bandwidth) which requires a complex multilevel data-coding scheme. The multilevel coding scheme decreases the voltage difference between different data values thus requiring an increase in the precision of the distortion equalizer to ensure that no data errors occur in the data detection section of the telemetry receiver.

Second, the telemetry signal is more distorted by the logging cable at higher data rates because of the increased interference encountered between the data symbols (encoded bits of data) because of the narrower data symbol time widths.

Another major demand on the signal equalizer is that it be adaptive to compensate for the large variations in telemetry signal distortion encountered in the course of logging the hostile-environment well.

Fortunately, many useful techniques have been developed for digital communication since 1948 when Claude Shannon determined the maximum date rate or information capacity of a coded communication channel. His important contribution was not so much that he presented a way to achieve the theoretical limits, it was more that he showed how poorly the systems of that generation performed. That fact, plus the tremendous need for communication between computers, has motivated researches to develop many new communication techniques, some of which are readily adaptable to building a robust wireline telemetry system. Another critical development has been the rapid increase in performance of low cost DSP (digital signal processing) integrated circuits.

Although many of these developments could be discussed, two techniques found are most useful for building an adaptive high data rate telemetry system capable of logging in hostile environments. Specifically, this disclosure will describe a wireline telemetry system that uses multilevel correlative coding to provide high data rates and adaptive equalization to deal with the variation in channel distortion. In addition, this system makes actual performance measurements of a field system to demonstrate the viability of these new techniques. The benefit of these techniques is that the logging engineer and producing company can be assured of reliable telemetry operation when running a string of modern high data rate wireline tools in hostile environment wells.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
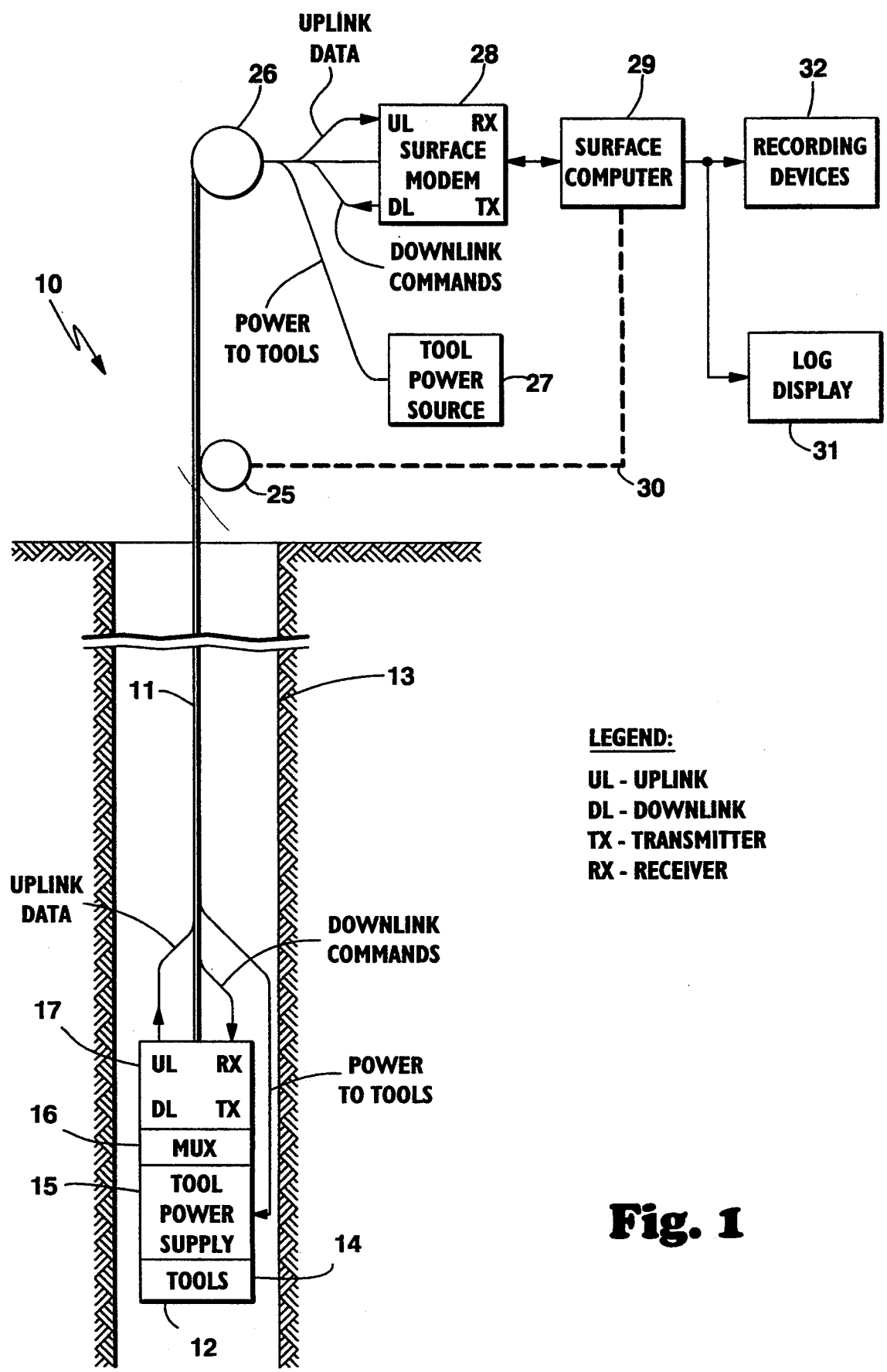
FIG. 1 shows a logging system involving a well tool suspended on a logging cable requiring telemetry along the logging cable to transmit data from the tool in the well borehole to the surface.

In a typical well logging system, as shown in FIG. 1, the uplink data is collected from sensors in the logging tools, time multiplexed, and transmitted to the surface by the uplink transmitter. The uplink receiver recovers the data and relays it to the surface processor where the logs are computed and displayed. Downlink commands originating in the surface computer system are transmitted by the downlink transmitter in the surface modem to the subsurface modem's downlink receiver and then relayed to the tools. Power is also transmitted from a surface tool power source over the logging cable to the downhole tool power supplies. The uplink data signal, downlink data signal and the tool power are frequency multiplexed on the cable to avoid interference.

Figure 2:
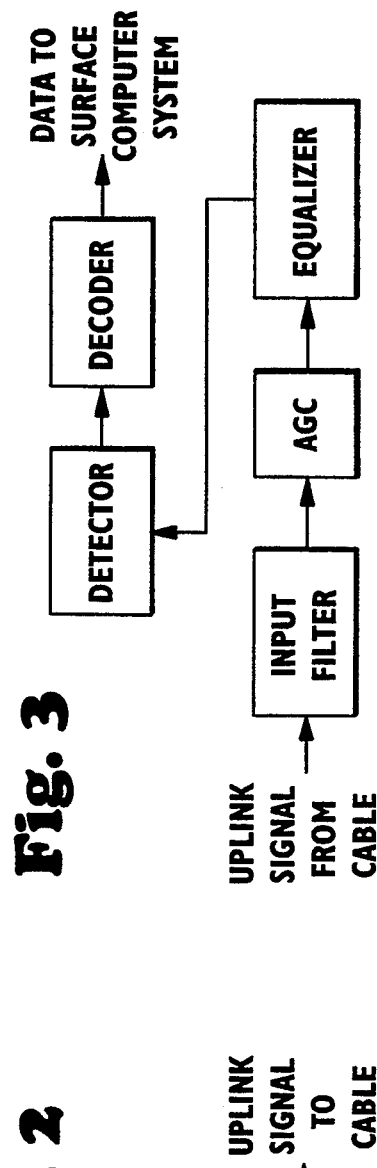
FIG. 2 is a block diagram schematic of the uplink in transmitter in the well tool in the well borehole.

In the typical transmitter, as shown in FIG. 2, data is collected from the logging tools and time multiplexed into a serial NRZ (non-return-to-zero) data stream. The serial data is first encoded to reshape the signal's baseband frequency spectrum then modulated into the desired uplink frequency band.

Figure 3:
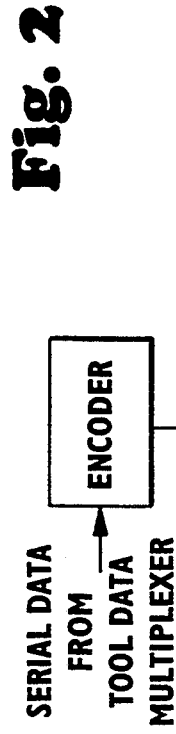
FIG. 3 is a block diagram schematic of the uplink receiver which is connected to the transmitter in FIG. 2.

A typical uplink receiver is shown in FIG. 3. The uplink data signal is first filtered to remove the downlink data signal and power and then amplified to a convenient level. The uplink signal is then equalized to remove the frequency dependent distortion caused by the logging cable. Finally, the signal is detected and decoded to recover the original data. After decoding, the uplink data is sent to the surface computer system.

The typical wireline telemetry system faces many obstacles to achieving high data rates and reliability, including extremes of temperature and pressure along with serious signal degradation caused by the logging cable. The primary limitations of the cable are the limited bandwidth and the frequency-dependent attenuation which are further complicated by the very wide range of variation in the signal distortion caused by the cable.

Figure 4:
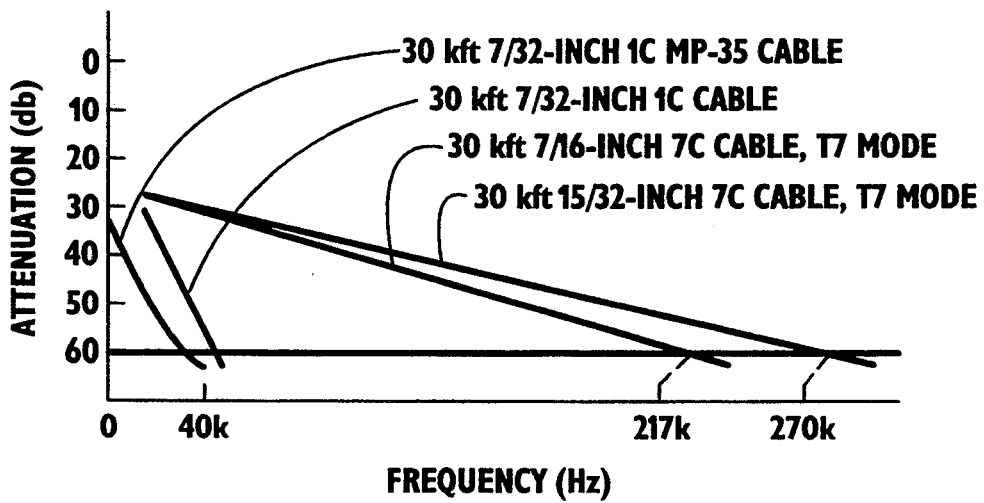
FIG. 4 is a cable frequency response curve plotting frequency versus attenuation.

Typical frequency response characteristics for commonly used logging cables are shown in FIG. 4. For practical reasons (signal-to-noise ratio and signal reflections) the bandwidth of a cable will be considered to extend from zero Hertz to the frequency which causes 60 db attenuation. The most commonly used cable in cased-hole and production logging applications 7/32 inch single conductor cable which has a 60 db bandwidth of 40 kHz for a length of 30,000 feet and a cable temperature of 30° C. The most commonly used openhole logging cable is 15/32 inch 7-conductor cable which has a 60 db bandwidth of 270 kHz for the T7 transmission mode at the same length and temperature. Despite this wide range in characteristics between the various cable types, the telemetry system must work over an even greater range due to the effects of temperature, pressure and different lengths of cable which vary from well to well and logging unit to logging unit.

Figure 5:
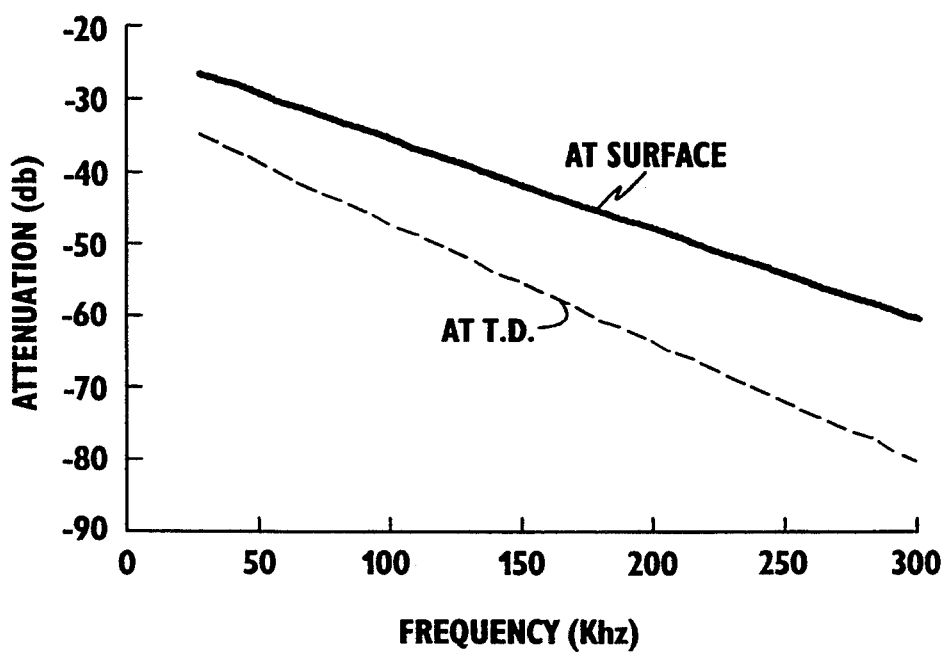
FIG. 5 is a response curve plotting frequency against attenuation for a particular cable at the surface and also in the well borehole.

FIG. 5 shows the estimated difference in cable frequency response when logging at the top and bottom of a 6700 meter, 250° C., well with a 15/32 inch logging cable. It can be seen that both the absolute attenuation and the slope (change in attenuation versus frequency) of the frequency response curve increase with temperature. Since it is the slope of the frequency response curve which causes the distortion of the telemetry signal, it is the change in slope which causes the change in the telemetry signal distortion at different borehole temperatures as the cable is lowered or raised into the well. For a telemetry system operating in to 90 to 270 kHz band, the slope change amounts to over a 7 db difference in attenuation across the transmission band.

Figure 6:
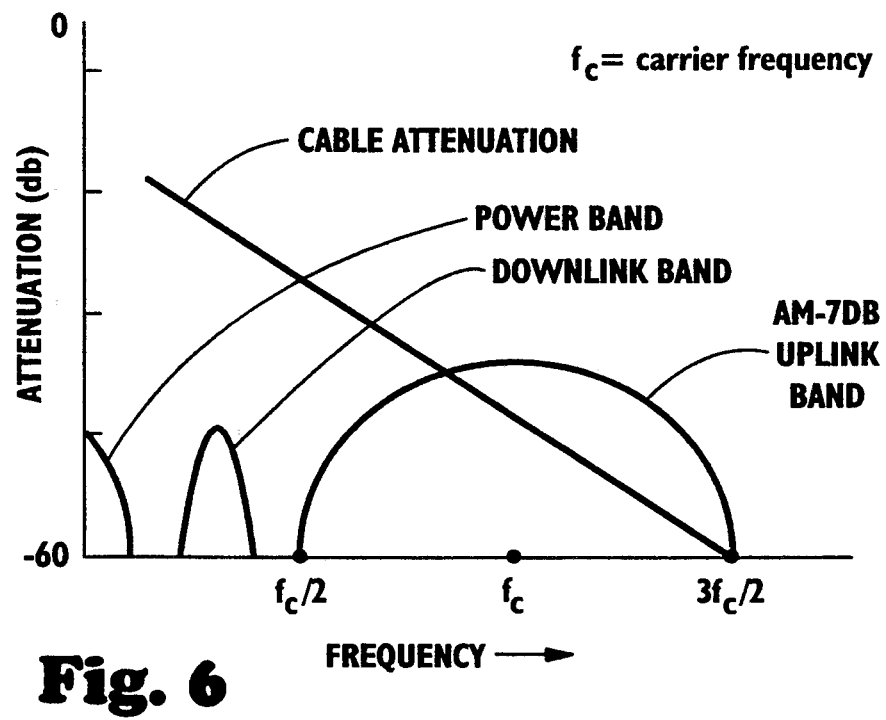
FIG. 6 is an allocation of the frequency spectrum for a telemetry system into separate frequency bands as a function of attenuation.

FIG. 6 shows a typical placement of uplink, downlink and power bands in the available cable bandwidth. The uplink band is placed in the upper two-thirds of total cable bandwidth. This simplifies implementation since the power, downlink, and uplink can be easily separated without requiring complicated filtering or noise cancellation. The power and downlink signals are placed in the lower part of the spectrum where the mean and variance in the attenuation is smaller, resulting in simpler implementation of the down equipment.

The achievable uplink data rate depends on the bandwidth efficiency of the type of signal transmitted. Bandwidth efficiency is defined as the data rate in bits per second per bandwidth interval in Hertz. The NRZ data signal is normally encoded and modulated before it is transmitted through the logging cable. The bandwidth efficiency and placement of the telemetry frequency band are determined by the encoding and modulation technique chosen. The NRZ data bit stream (1's and 0's) is encoded into a stream of "symbols" which typically have a number of amplitude levels and may have a "quadrature" or "phase" component. The "quadrature" modulation technique, where two carriers of the same frequency but 90 degrees out of phase are summed together, results in a doubling of the data rate in the same frequency passband. Partial response signaling (PRS) is an encoding technique that allows us to build practical digital communication systems with no excess bandwidth required to obtain robust signal detection. Duobinary coding (DB) is non-quadrature multilevel partial response encoding technique.

Table 1 shows the bandwidth efficiencies of a number of signal data types along with the telemetry data rate achievable over 30,000 feet of both 7/32 inch monocable and 15/32 inch 7-conductor cable. For example, it can be seen that for cased-hole logging on 30,000 feet of 7/32 inch monocable, 54 kbps can be achieved with AM-7DB (amplitude-modulated 7-level duobinary) and 108.8 kbps can be achieved with 49-QPRS (49point quadrature-partial-response-signaling). For open-hole logging on 30,000 feet of 15/32 inch 7-conductor cable, 360 kbps can be achieved with AM-7DB and 16-QAM (16-point quadrature-amplitude-modulation) and 720 kbps can be achieved with 49-QPRS. It should be noted that the; absolute data rates listed in Table 1 can be effectively increased with the use of data compression techniques.

The major cause of unreliability in wireline telemetry systems is the wide variation in the signal distortion caused by such things as cable type, cable length, cable condition, depth-in-the-hole, and temperature effects on the tools and cable. The receiver's equalizer must correct for the cable-produced signal distortion before the data can be reliably recovered from the signal. The demands on the equalizer to accurately correct the distortion are very severe for complex signal coding techniques such as AM-7DB and 49-QPRS, especially when the cable is subjected to the wide range of temperatures encountered in hostile environment (250° C.) wells.

Figure 7:
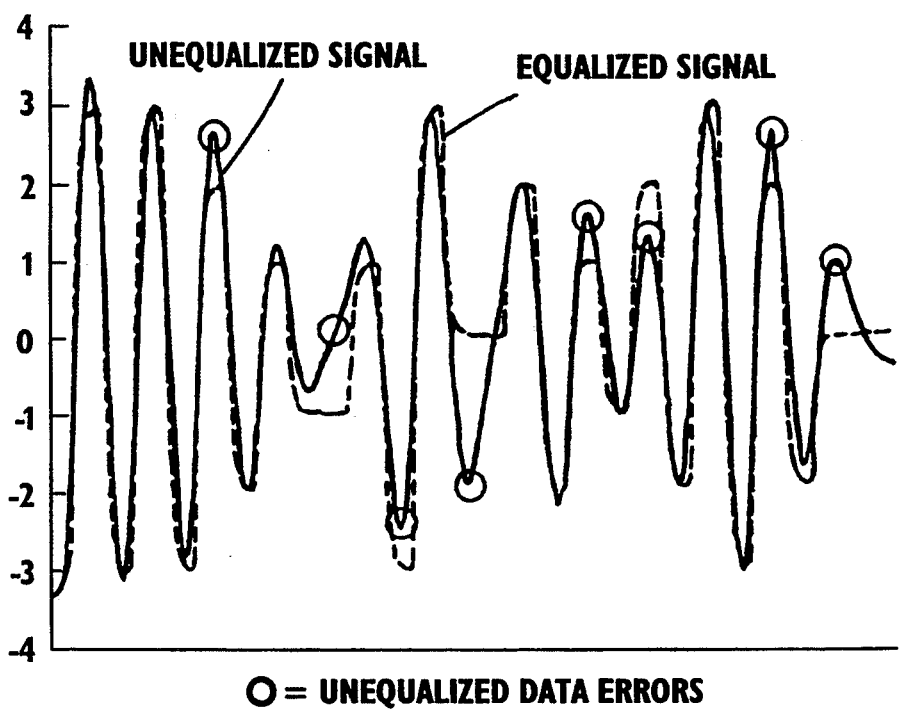
FIG. 7 is a amplitude modulated multiple level transmission system showing line signals.

FIG. 7 shows typical AM-7DB signals in their undistorted form out of the transmitter and their distorted form after passing through the cable. This distortion must be corrected by the equalizer before the data can be recovered. Note in FIG. 7 that without equalization there would be 8 data errors.

Figure 8A:
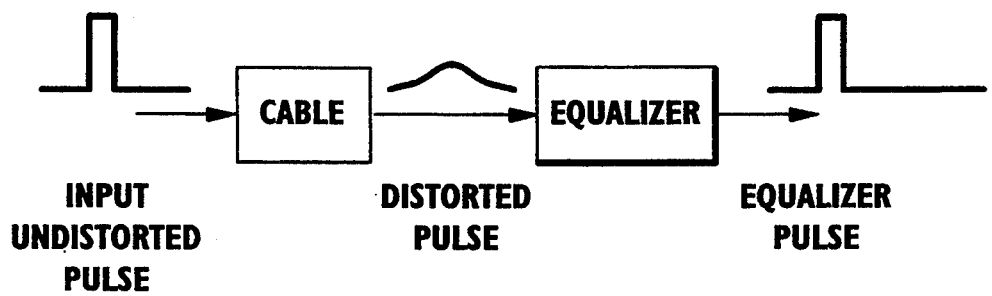
FIG. 8(A/B) is an analog equalizer which particularly shows the problem but which also shows an older system which does not effectively deal with the problem.
Figure 8B:
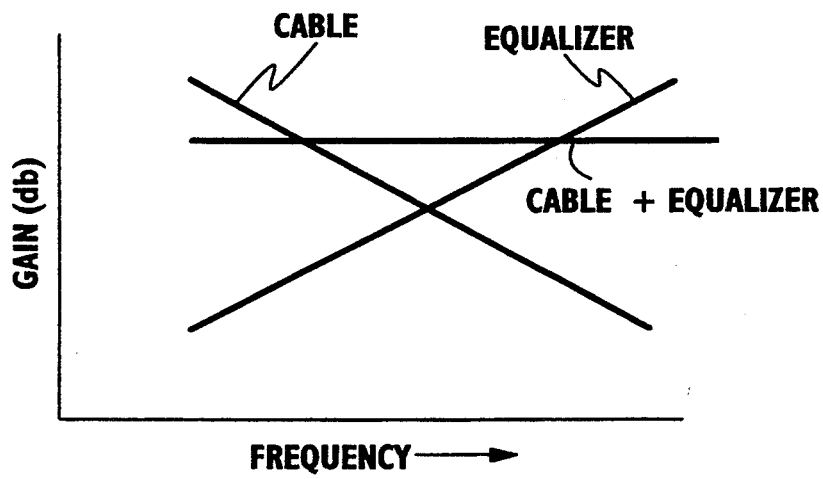

FIG. 8 shows the operation of an analog equalizer used in a number of older wireline telemetry systems. In generally, any equalizer must correct for both the gain and phase distortion in order to perfectly restore the signal to the original undistorted shape. For simplicity, FIG. 8 shows only how the cable's gain vs frequency characteristic is equalized. Analog equalizers have a number of problems including:

(1) It is very difficult to build an analog equalizer that will properly equalize the phase in addition to the gain over the required band of frequencies.

(2) An analog equalizer corrects for only one set of distortion conditions. An infinite number of analog equalizer circuits would have to be built to continuously compensate for the changing distortion encountered while lowering or raising the tools into the well. Normally, analog equalization of wireline signals is done by switching between a limited number of fixed equalizers at various discrete times as the tools are lowered into the well.

(3) Adaption of the equalizer is also difficult because a good measure of the signal distortion, required to determine when to switch between the fixed analog equalization settings, is difficult to ascertain with analog means.

Figure 9:
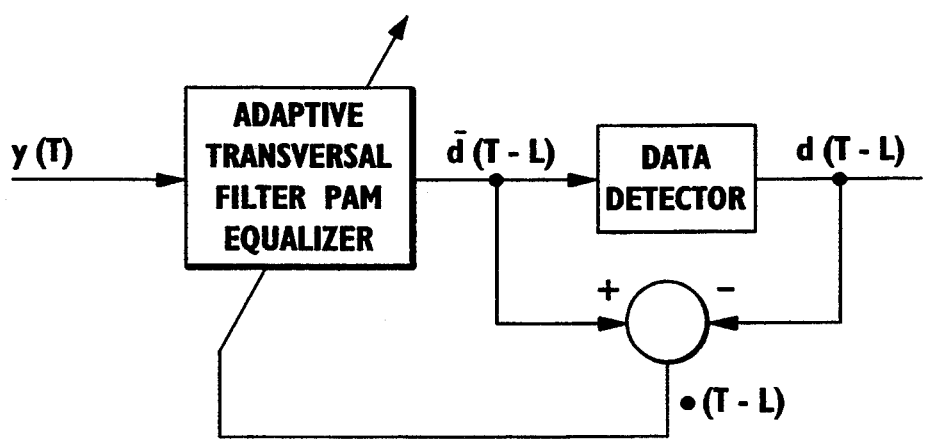
FIG. 9 is a block diagram schematic of an adaptive digital equalizer and the level slicer.

An adaptive signal equalizer as shown in FIG. 9. The transfer function of the digital transversal filter equalizer is determined by its digital filter coefficients. The coefficients are adapted to minimize the difference between the equalizer's output and the detected estimate of the original data. The equalizer makes a small adjustment of the coefficients after processing each received data symbol. When the equalizer is optimally adjusted or adapted, the output signal is approximately equal to the original transmitted signal before it was distorted by the cable. A mathematical description of the adaptive transversal filter equalizer and the stochastic-gradient algorithm used to adapt the filter's coefficients is given below.

The benefits of adaptive transversal filter equalizers include:

(1) Capable of almost perfectly equalizing extreme amounts of signal distortion which allows use of the entire available passband of the cable, resulting in higher reliable data.

(2) The precise equalization allows the use of very complex signal codes which have been bandwidth efficiency, resulting in higher data rates.

(3) The equalizer can be adjusted to compensate for the distortion caused by cables with widely varying characteristics. This means the telemetry will work reliably with practically any cable.

(4) Continuous adaption to the changing signal distortion caused by the changing borehole conditions as to the tool is lowered into or raised out of the well leading to robust operation over the wide range of borehole conditions encountered in hostile, environment wells.

An earlier U.S. Pat. No. 5,010,333 discloses an AM-7DB system for use with cased-hole services on 7/32 inch monocable and for hostile environment open-hole services on 7/16 inch or 15/32 inch 7-conductor 7C) cable. When used with cased-hole tools on 7/32 inch monocable, the uplink operates in the 13.5 kHz to 27 kHz frequency band at a data rate of 54 kilobits per second (kbps). When used with hostile environment openhole tools on 7/16 inch and 15/32 inch 7-conductor cable, the uplink operates in the 27 kHz to 81 kHz frequency band at a data rate of 108 kbps.

Figure 10:
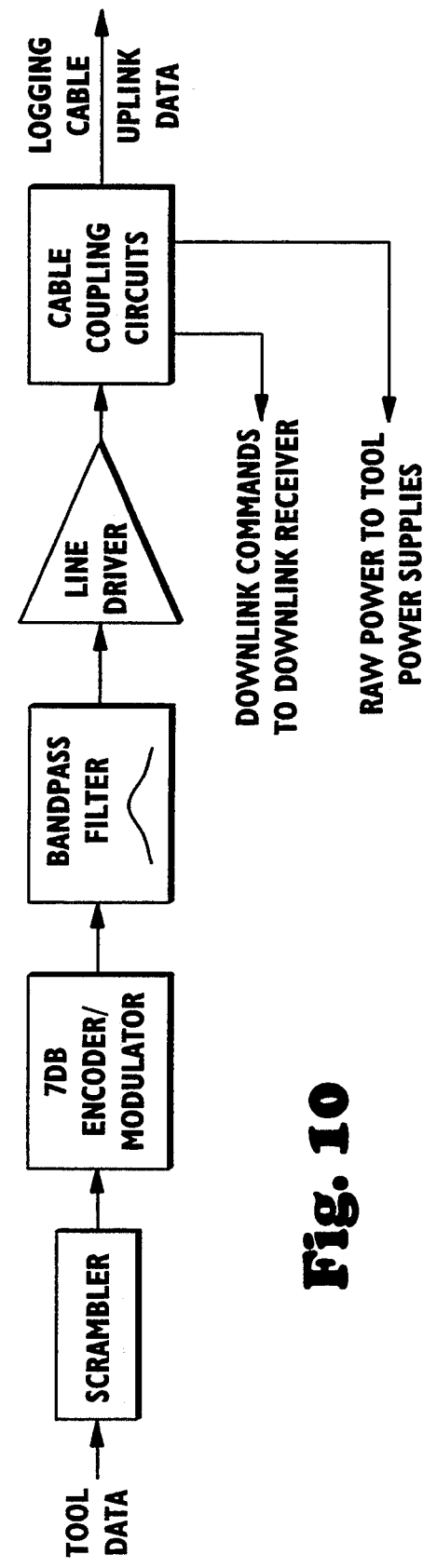
FIG. 10 is an uplink transmitter shown in greater detail in block form.

A block diagram of the AM-7DB uplink transmitter is shown in FIG. 10. The transmitter includes a data scrambler, 7-level duobinary (7DB) data encoder, amplitude modulator (AM), cable driver and cable coupling circuits.

Figure 11A:
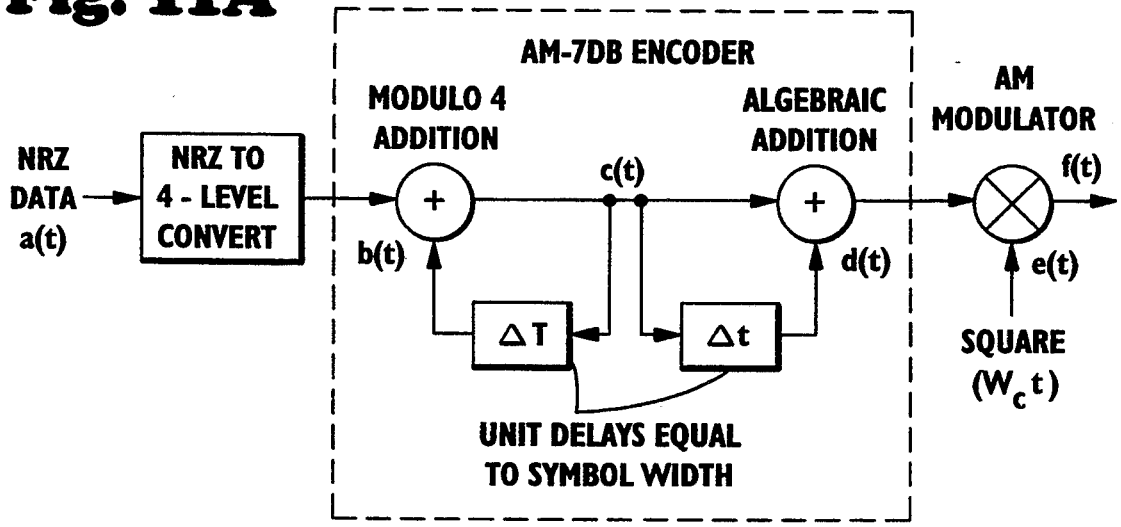
FIG. 11(A/B) shows the relationship between the 7 level encoder and the AM modulator involved in the encoder.
Figure 11B:
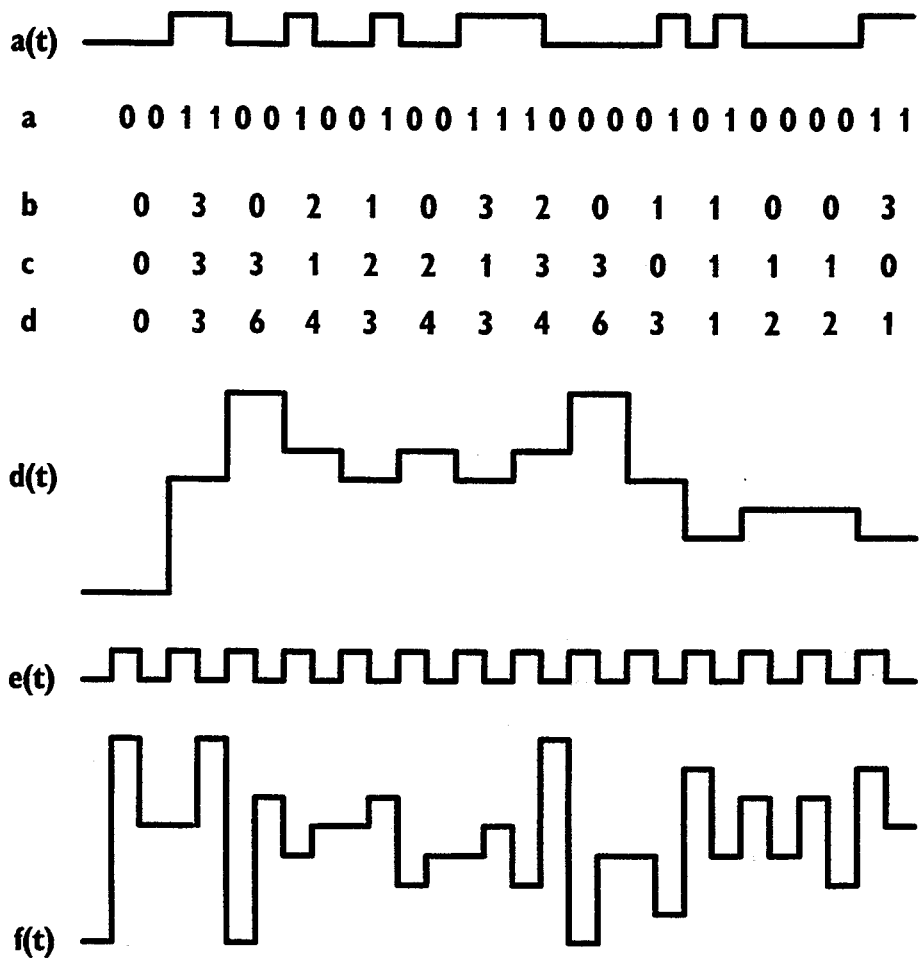

The operation of the 7DB encoder and AM modulator is shown in FIG. 11. The encoder works as follows. First, the binary NRZ input signal, a(t), is converted to a four-level signal, b(t). The four level signal, b(t), is precoded to get c(t) which is then encoded to get the 7-level 7DB signal, d(t). The equations governing the operation of the 7DB precoder and coder are:

$$c(t)=b(t)\theta \Delta b(t), \text{ modulo 4 subtraction}$$

$$d(t)=c(t)+\Delta c(t), \text{ algebraic addition}$$

where $\Delta$ is a unit time delay equal to the data symbol width. The AM modulator operates by multiplying the 7DB signal by the carrier frequency, $\omega_c$.

Figures 12, 15:
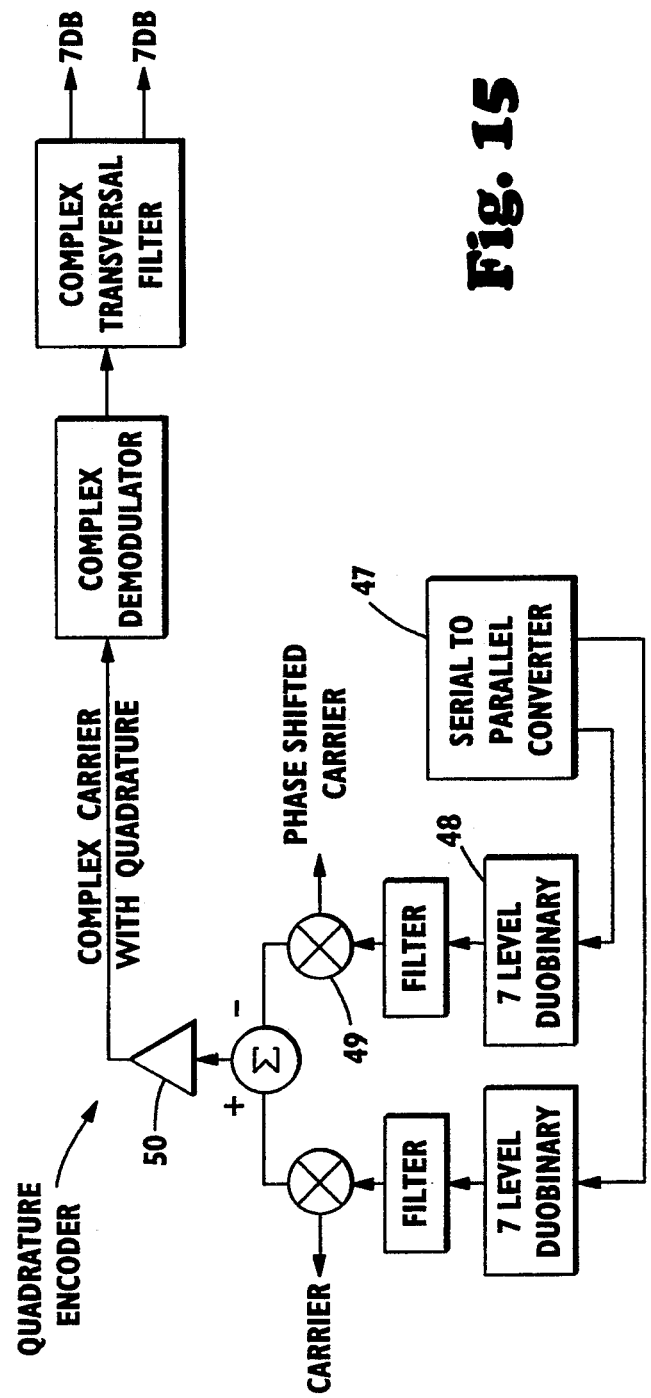
FIG. 12 shows a block diagram schematic of an uplink receiver.
FIG. 15 is a quadature encoder and decoder.

A block diagram of the uplink receiver is shown in FIG. 12. The receiver includes cable coupling circuits, input filter, clock recovery circuit, demodulator, adaptive equalizer, 7-level data detector (7-level discriminator or slicer) and 7DB decoder. The input filter is implemented with a switched-capacitor filter. The demodulator, equalizer, detector and decoder are implemented in a single chip digital signal processor.

AM-7DB system operates at 360 Kbps in the 90 kHz to 270 kHz frequency band on 30,000 feet of 15/32 inch 7C cable.

A quadrature version of the high-speed experimental AM-7DB system (49-QPRS) operating at 720 kbps in the 90 to 270 kHz frequency band on 30,000 feet of 15/32 inch 7-conductor cable is shown in FIG. 15.

Figure 13A:
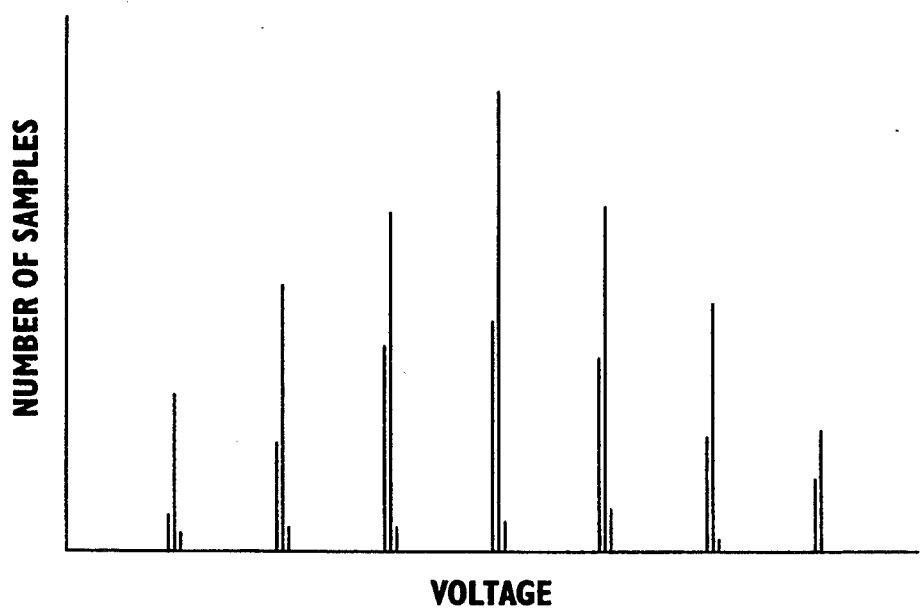
FIG. 13(A/B) includes histograms.
Figure 13B:
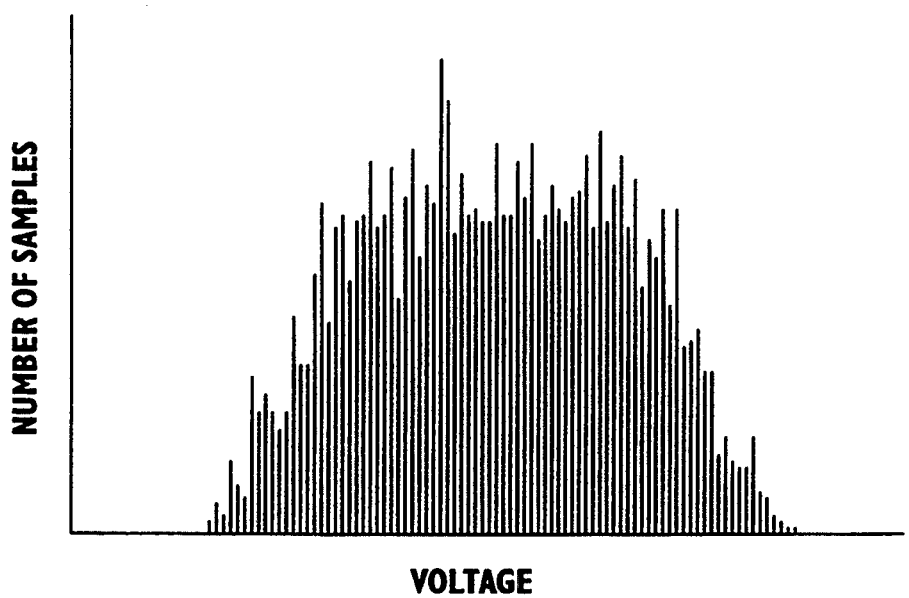
Figure 13C:
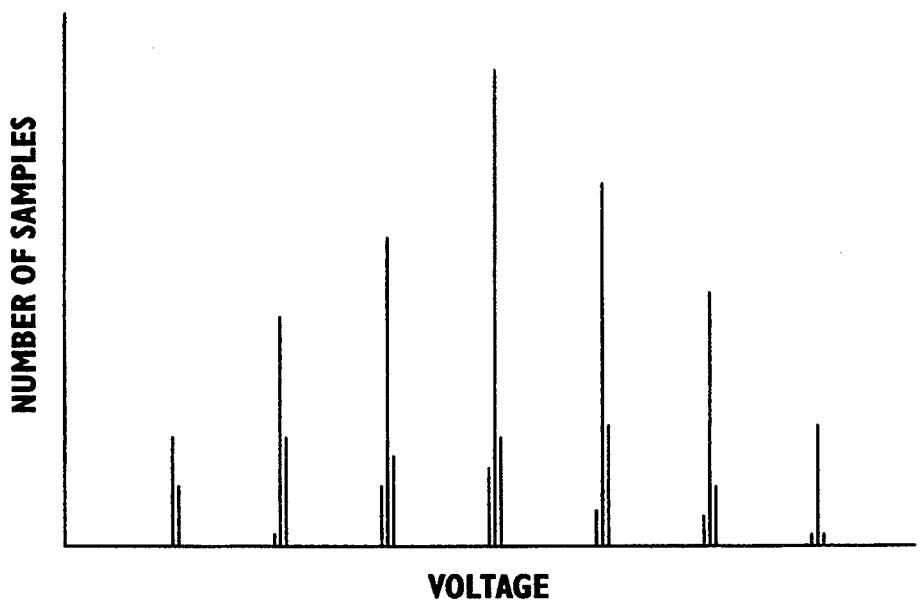

The AM-7DB telemetry system described above was field tested at 108.8 kbps with standard 7/16 inch and 15/32 inch 7-conductor cables. FIG. 13 shows the signal histograms of the transmitted, received and equalized telemetry signals obtained when operating the AM-7DB telemetry system at 108.8 kbps on 26,000 feet of 7/16" 7-conductor cable. The histogram of the transmitted telemetry signal shown in FIG. 13(a) clearly shows the clustering of the original transmitted signal around 7 voltage levels. The histograms of the received signal shown in FIG. 13(b) shows the result of the signal distortion produced by logging cable. The transmitted signal has been distorted so that the original 7 voltage levels can no longer be distinguished or detected. After the distorted received telemetry signal has been equalized using the adaptive equalizer the 7 original voltage levels are again easily distinguishable as seen by the histogram of the equalizer output shown in FIG. 13(c).

Figure 14A:
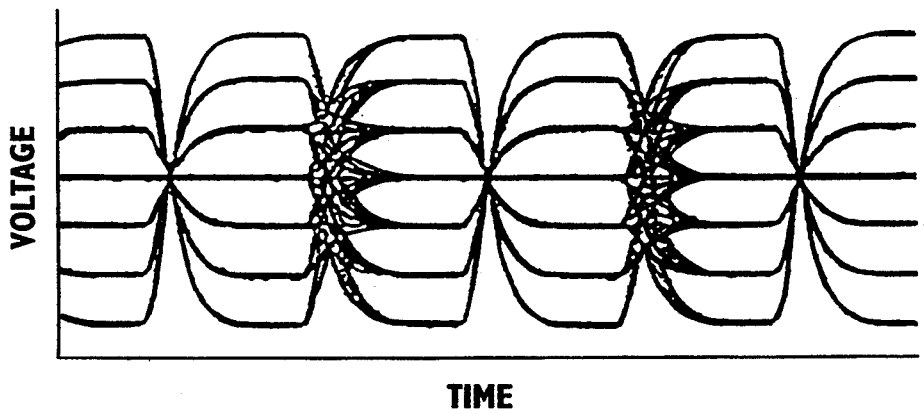
FIG. 14(A/B) is another diagram sometimes known as an eye diagram.
Figure 14B:
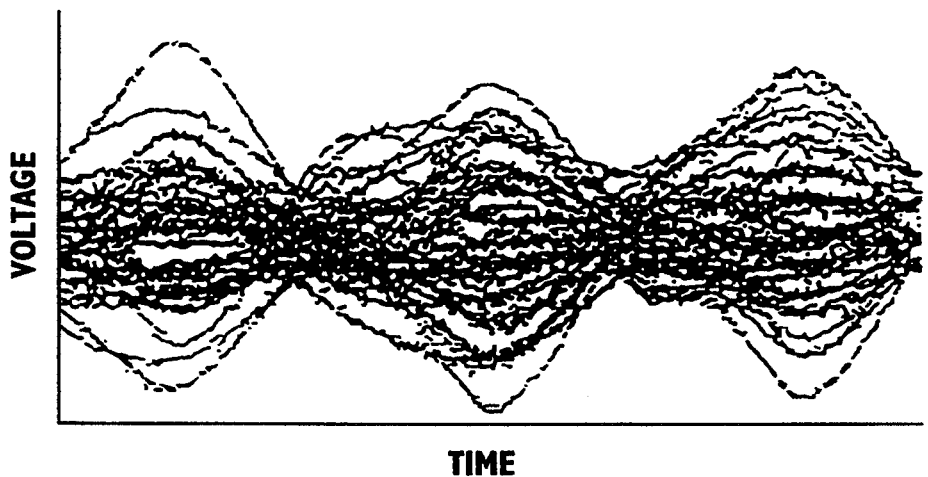
Figure 14C:
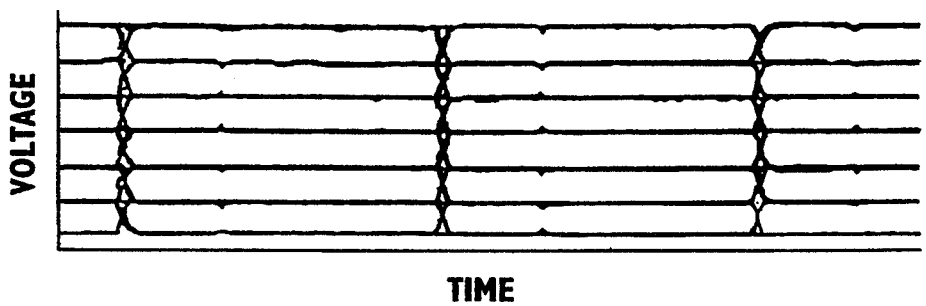

FIG. 14 shows "eye diagrams" of the same transmitted, received and equalized signals whose histograms are depicted in FIG. 13. An "eye diagram", so called because its shape is similar to the human eye, is generated on an oscilloscope where the symbol timing is used as a trigger. The eyes are transmitted and equalized signals are clearly "open" while the eye of the distorted received signal is closed.

The AM-7DB telemetry system was also lab tested at 54.54 kbps with 30,000 feet of standard 7/32 monocable and with 26,000 feet of MP35 7/32 inch monocable (used in sour-gas cased hole logging operations). For these lab tests, the transmitted telemetry signal was attenuated by a factor of 10-to-1 to simulate the additional signal loss at hostile environment temperatures. Under these conditions, the standard deviation of the slicing error (difference between actual data and equalizer output) was 6.41% while the maximum slicing error was about 30%. The slicing error must exceed 100% to produce an actual data error in the detector.

Similar results were obtained using the AM-7DB system in the field with cased hole tools and 26,000 feet of standard 7/32 inch monocable.

The AM-7DB telemetry system was then modified to increase receiver's DSP processing speed to allow the system to operate at the higher data rates predicted in Table 1 for an AM-7DB telemetry system operating on 15/32 inch 7-conductor cable. The system operated reliably with no data errors at 360 kbps on 30,000 feet of 15/32 inch 7C cable. The standard deviation of the slicing error in the detector was about 8% which is about four times better than required for a robust fieldworthy system. The output of the slicer in a field logging unit can be monitored in real time, providing a direct indication of the quality of the received data stream.

A quadrature version of the AM-7DB system (49-QPRS) operating at 720 kbps in the 90 to 270 kHz frequency based on 30,000 feet of 15/32 inch 7-conductor cable was simulated on a Comdisco SPW signal processing workstation. The simulation results indicate that a robust 49-QPRS telemetry system can be built that will operate in the 90 kHz to 360 kHz band at 720 kbps on 30,000 feet of standard 15/32 inch 7-conductor open-hole logging cable, see FIG. 15.

The equation governing the operation of the transversal filter pulse-amplitude-modulation (PAM) equalizer is:

$$a(T-L) = \sum_{j=-L}^{L} c_j y(T + L + j)$$

where (T−L) is the output of the equalizer at time T−L, and $c_j$, $-L < j < L$, are the $n = 2L+1$ transversal filter coefficients. The coefficients are subscripted from −L to L to be consistent with the literature in adaptive equalization; this emphasizes the fact that the transversal equalizer is compensating for intersymbol interference from both sides of the current data symbol. For the same reason, and because of the causality constraint, the output of the transversal filter is considered as an estimate of d(T−L), rather than d(T), and is labeled d(T−L). This signals is connected to the slicer to make the decision on the data symbol. The estimation error is given by $$e_c(T-L) = a(T-L) - d(T-L).$$

A criterion that can be used to select the filter coefficients is the minimization of the output means square error $\epsilon$, where $\epsilon = E[e(T-L)]$. The criterion is not equivalent to minimizing the probability of error, but it is close enough for practical purposes.

The adaption of the transversal filter coefficients is done with the stochastic gradient algorithm. The equation for the adaption of the jth coefficients is $$c_j(T+1) = c_j(T) + \beta e_c(T) y(T-j+1).$$

In accordance with the equation, $C_j(T)$ is obtained by cross-correlating (using a time average) the estimation error $e_c(T)$ with the delayed input $y(T-j+1)$ and step-size $\beta$ and accumulating the result. This accumulation is the discrete-time analog of integration in the continuoustime. The change in the coefficient of the ith tap at each iteration is a function of the value of the delayed signal at that tap, the slicing error, and an adaption coefficient $\beta$.

1. Multilevel duobinary coding can be used for bandwidth reduction of telemetry signals allowing higher wireline telemetry data rates than can be achieved with binary NRZ. A bandwidth efficiency of 2 bits/second/Hz can be achieved with an amplitude modulated 7-level duobinary (AM7DB) telemetry signal. This bandwidth efficiency allows AM-7DB wireline telemetry systems to be built that will operate at data rates of 54.4 kbps on 30,000 feet of 7/32 inch single-conductor cased-hole logging cable and 360 kbps on 30,000 feet of 15/32 inch 7-conductor open-hole logging cable.

2. Quadrature amplitude modulation can used to double the bandwidth of amplitude modulated signals allowing higher wireline telemetry data rates. A bandwidth efficiency of 4 bits/second/Hz can be achieved with a 49-point quadrature-amplitude-modulated (49-QPRS) telemetry signal. This bandwidth efficiency allows 49-QPRS telemetry systems to be built that will operate at a data rate of 720 kbp on 30,000 feet of 15/32 inch open-hole 7-conductor logging cable.

3. Sophisticated digital transversal filter equalizers have been made possible in recent years by the emergence of powerful single chip digital signal processors. The new adaptive digital equalizers, in sharp contract to older analog equalizers, allow almost perfect correct of the distortion of the telemetry signals caused by he logging cable. The result has been that telemetry receivers can now be built that will robustly recover complex telemetry signals such as AM-7DB and 49-QPRS, allowing much higher data rates.

4. Adaptive digital equalization, in contrast to older analog equalizers, can continuously correct for cable distortion as the tools are lowered and raised in the well.

5. Robust high-data-rate hostile-environment wireline telemetry systems can be built with the aid of modern communication techniques. These systems also provide self-monitoring features which gives the user a real-time telemetry quality control indicator.

While the foregoing is directed to the preferred embodiment of the present invention, other and further embodiments of the invention may be devised without departing from the basic scope thereof, and the scope thereof is determined by the claims which follow.

What is claimed is:

1. A telemetry system for use in transferring data from a sonde in a well borehole to the surface via cable the system including a sonde supported uplink transmitter, comprising:
    (a) at least one sensor supported in the sonde;
    (b) a multi-level duobinary encoder connected to said sensor for receiving a flow of sensor data therefrom and encoding the sensor data to form an encoded stream of data symbols;
    (c) a quadrature modulator to produce a quadrature output signal, comprising:
        (1) a first quadrature modulator receiving the encoded stream, said first quadrature modulator being modulated by a first carrier to produce a first signal;
        (2) a second quadrature modulator receiving the encoded stream, said second quadrature modulator being modulated by a second carrier that is phase shifted with respect to the first carrier to produce a second signal;
        (3) a summer for summing the first and second signals to provide a quadrature modulated output signal; and (d) an output driver provided with said quadrature modulated output signal and having an output connected to the cable extending from the sonde to the surface.

2. The telemetry system of claim 1, further including a complex demodulator to receive signals from the output driver.

3. The telemetry system of claim 2, further including a complex transversal filter to receive signals from the complex demodulator.

4. The telemetry system of claim 1, further comprising a serial-to-parallel converter interposed between the encoder and the first and second quadrature modulators.

5. A telemetry method for transferring data from a sonde in a well borehole to the surface via cable utilizing a sonde supported uplink transmitter, comprising steps of:
(a) sensing logging signals with at least one sensor supported in the sonde;
(b) receiving a flow of sensor data from the sensor and performing multi-level duobinary encoding upon the sensor data to form an encoded data stream; and
(c) providing a quadrature modulated output signal by performing steps comprising:
(1) receiving the encoded stream and modulating the data stream with a first carrier to produce a first signal;
(2) receiving the encoded data stream and modulating the data stream with a second carrier that is phase shifted with respect to the first carrier to produce a second signal; and
(3) summing the first and second signals to provide a quadrature modulated output signal.

6. The telemetry method of claim 5, further including a step of applying a complex demodulator to the quadrature modulated output signal.

7. The telemetry method of claim 6, further including a step of applying a complex transversal filter to signals from the complex demodulator.

* * * * *

UNITED STATES PATENT AND TRADEMARK OFFICE
CERTIFICATE OF CORRECTION

PATENT NO. : 5,365,229
DATED : November 15, 1994
INVENTOR(S) : Wallace R. Gardner, et al.

It is certified that error appears in the above-indentified patent and that said Letters Patent is hereby corrected as shown below:

Column 1, Line 59, replace "researches" with --researchers--.

Column 2, Line 29, following "uplink", delete "in".

Column 2, Line 60, replace "quadature" with --quadrature--.

Column 4, Line 26, following "is", insert --a--.

Column 4, Line 35, replace "(49point)" with --(49-point)--.

Column 4, Line 41, replace "the;" with --the--.

Column 4, Line 65, replace "generally" with --general--.

Column 5, Line 42, following "have", delete "been".

Column 5, Line 49, following "as", delete "to".

Column 5, Line 56, replace "7C)" with --7C--.

Column 7, Line 43, replace "signals" with --signal--.

Column 8, Line 19, replace "kbp" with --kbps--.

Column 8, Line 24, replace "contract" with --contrast--.

Column 8, Line 25, replace "correct" with --correction--.

Column 8, Line 26, replace "he" with --the--.

UNITED STATES PATENT AND TRADEMARK OFFICE
CERTIFICATE OF CORRECTION

PATENT NO. : 5,365,229
DATED : November 15, 1994
INVENTOR(S) : Wallace R. Gardner, et al.

It is certified that error appears in the above-indentified patent and that said Letters Patent is hereby corrected as shown below:

Column 8, line 35, replace "gives" with --give--.

Signed and Sealed this

Ninth Day of May, 1995

Attest:

BRUCE LEHMAN

Attesting Officer        Commissioner of Patents and Trademarks